April 13, 1926.

E. RABA

STEERING MECHANISM FOR AUTOMOBILES

Filed July 12, 1923

1,581,014

Inventor
Ernest Raba.

By
Attorney

Patented Apr. 13, 1926.

1,581,014

UNITED STATES PATENT OFFICE.

ERNEST RABA, OF PAWNEE, OKLAHOMA.

STEERING MECHANISM FOR AUTOMOBILES.

Application filed July 12, 1923. Serial No. 651,101.

*To all whom it may concern:*

Be it known that I, ERNEST RABA, residing at Pawnee, county of Pawnee, and State of Oklahoma, and a citizen of the United States, have invented certain new and useful Improvements in Steering Mechanism for Automobiles, of which the following is a specification, reference being had to the accompanying drawing, forming a part thereof.

My invention relates to steering mechanism for automobiles and particularly to steering mechanism of the type commonly used in automobiles of the Ford type in which a lever arm on the steering shaft is connected through a rod or link with one of the stub axles and the movement of the steering wheel is transmitted positively and directly to the stub axle and, on the other hand, movement of the front wheels due to irregularities of the road bed are transmitted positively and directly to the steering wheel.

It is the object of my invention to provide a simple, effective and, at the same time, inexpensive mechanism for connecting the steering shaft with the stub axle by which the movement transmitted from the steering wheel will, while definite and certain, be so far yielding that it will be gradual and without shock, and by which the movement of the front wheels will be so far taken up in transmission to the steering wheel that the movement imparted to the steering wheel will be materially lessened and will be free from shock. A further object of the invention is to provide a mechanism for the purpose indicated which may be quickly and easily substituted for the mechanism now used without changing any of the other parts.

With the objects above indicated, and other objects hereinafter explained my invention consists in the construction and combination of elements hereinafter described and claimed.

Referring to the drawings.

Figures 1, 2:
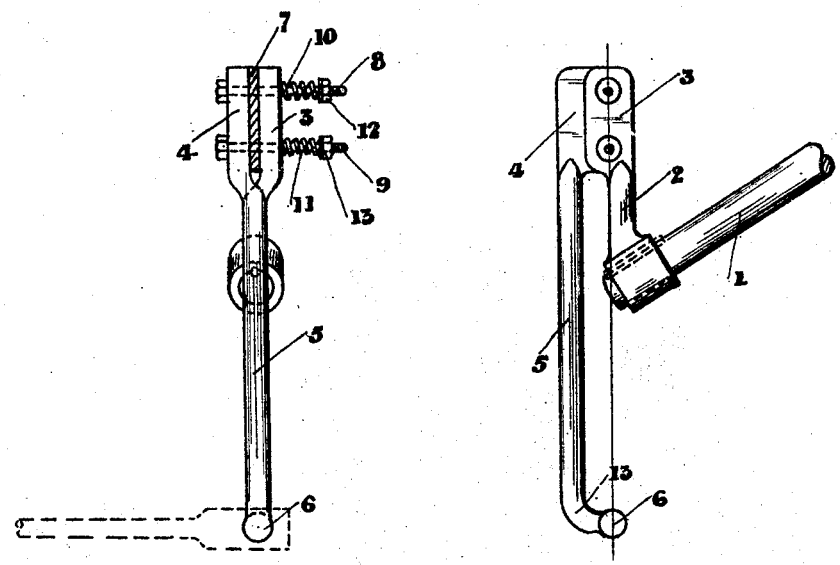
Figure 1 is a front view of a steering shaft connection embodying my invention.
Figure 2 is a side view of the same.

In the drawings 1 indicates the shaft of the usual steering wheel of an automobile of the Ford type.

In the usual construction of automobiles of the Ford type the steering wheel shaft is provided in its forward end with a depending arm provided on its lower end with the ball member of a ball and socket of which the socket member is carried by a horizontal rod connected at its outer end with the stub shaft of one of the wheels.

In place of the downwardly extending arm of the ordinary construction I substitute an upwardly extending arm 2 keyed to the end of the steering shaft as shown. This arm 2 is flattened at its upper end, as shown at 3, the faces of the flattened portion being in planes parallel with the axis of the steering wheel shaft. Against one face of this flattened portion 3 is secured one face of the corresponding flattened upper end portion 4 of an arm 5 which extends downward in line with the axis of the steering wheel shaft past the line of this axis and carries on its lower end a ball 6 to fit the socket on the end of the rod of the usual steering mechanism.

Between the adjacent faces of the flattened portion 3 of the arm 2 and the flattened portion 4 of the arm 5 a strip 7 of fibre or other customary material is preferably interposed. The faces of these flattened portions are yieldingly held together by upper bolt 8 and down bolt 9 each of which is provided with a spring 10, 11 between the outer face of the flattened portion 3 and a nut 12, 13. By turning these nuts one way or the other the tension of the springs may be regulated as desired. The bolts 8 and 9 are both in line with the centre of the ball 6 on the lower end of the arm 5.

Figure 3:
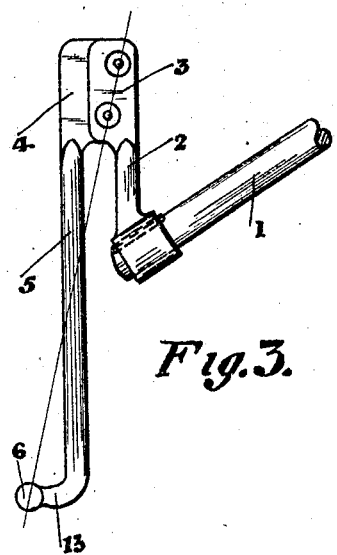
Figure 3 is a side view of a modified form.
Figure 4:
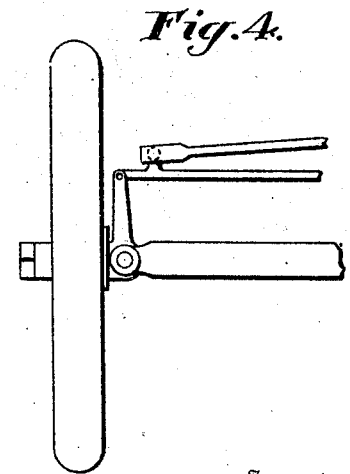
Figure 4 is a plan view of the usual tie rod and drag link for steering the stub axles of an automobile, only one half of the axle being shown.

The ball 6 is carried on a short arm 13 extending rearward as shown in Figures 1 and 2 or extending forward as shown in Figure 3.

When the steering shaft is rotated by means of the usual steering wheel the upper end of the arm 2 will be correspondingly swung in one direction or the other and will swing the upper end of the arm 5 with it causing the lower end of this arm carrying the ball 6, to swing in the opposite direction. If the flattened ends 3 and 4 of arms 2 and 5 were rigidly clamped together the arm 5 would swing on a centre in line with the axis of the steering shaft. As the springs 10 and 11 permit more or less yielding in the connection between the two arms the arm 5 will swing on a centre more or less out of line with the axis of the steering shaft, the steering movement imparted to the wheels being a gradual movement without shock.

The movements of the wheels caused by irregularities in the road surface are imparted through the usual horizontal rod and the ball and socket at the lower end of arm 5. In the ordinary construction these movements act positively upon the steering shaft and cause the steering wheel to be constantly in rotation in one direction or the other. In the present construction the movement of the lower end of arm 5 is transmitted through the yielding connection formed by the bolts 8 and 9, the spring on bolt 8 permitting yielding in one direction and the spring on bolt 9 permitting yielding in the other direction, the arm 5 swinging, within the limits of the yield permitted, on a centre located near the upper end of the arm 2 instead of, as in the usual construction, on a centre in line with the axis of the steering shaft. By reason of this connection the vibration due to the movements of the wheels is largely taken up without causing violent vibration of the steering wheel.

Having thus described my invention what I claim is:

1. In steering mechanism for automobiles the combination with the steering shaft and the rod connected to the stub axle, of an upwardly extending arm secured to the steering shaft, an arm yieldingly secured at its upper end to the upper end of said upwardly extending arm and extending downward through the line of the axis of the steering shaft and having its lower end provided with means for connecting it to the rod connected to the stub axle.

2. In steering mechanism for automobiles the combination with the steering shaft and the rod connected to the stub axle, of an upwardly extending arm secured to the steering shaft having its upper end slightly offset flattened in the plane of the axis of the steering shaft, an arm having its upper end flattened to fit against the flattened end of said upwardly extending arm and secured thereto and offset oppositely to said upwardly extending arm and extending downward through the line of the axis of the steering shaft and having its lower end provided with means for connecting it to the rod connected to the stub axle.

3. In steering mechanism for automobiles the combination with the steering shaft and the rod connected to the stub axle, of an upwardly extending arm secured to the steering shaft having its upper end flattened in the plane of the axis of the steering shaft, an arm having its upper end flattened to fit against the flattened end of said upwardly extending arm and yieldingly secured thereto and extending downward through the line of the axis of the steering shaft and having its lower end provided with means for connecting it to the rod connected to the stub axle.

4. In steering mechanism for automobiles the combination with the steering shaft and the rod connected to the stub axle, of an upwardly extending arm secured to the steering shaft having its upper end flattened in the plane of the axis of the steering shaft, an arm having its upper end flattened to fit against the flattened end of said upwardly extending arm and yieldingly secured thereto by an upper and a lower bolt, each provided with a spring acting to hold the ends of the two arms together, and extending downward through the line of the axis of the steering shaft and having its lower end provided with means for connecting it to the rod connected to the stub axle.

In testimony whereof I hereunto affix my signature.

ERNEST RABA.